United States Patent [19]

Ishii et al.

[11] Patent Number: 4,616,273
[45] Date of Patent: Oct. 7, 1986

[54] TAPE RECORDING APPARATUS PROVIDED WITH A BIAS CONTROL DEVICE

[75] Inventors: Eiichi Ishii; Makoto Yoshimizu, both of Tokyo, Japan

[73] Assignee: NEC Corporation, Tokyo, Japan

[21] Appl. No.: 724,572

[22] Filed: Apr. 18, 1985

[30] Foreign Application Priority Data

Apr. 18, 1984 [JP] Japan ................................. 59-77732

[51] Int. Cl.[4] ............................................... G11B 5/03
[52] U.S. Cl. ..................................................... 360/66
[58] Field of Search ........................ 360/66, 31, 25, 68

[56] References Cited

U.S. PATENT DOCUMENTS

| | | | |
|---|---|---|---|
| 3,838,452 | 9/1974 | Royce ..................... | 360/66 |
| 4,438,466 | 3/1984 | Falkes et al. ........... | 360/66 |
| 4,454,548 | 6/1984 | Jensen ..................... | 360/66 |
| 4,470,084 | 9/1984 | Bingaman ................ | 360/66 |

Primary Examiner—Vincent P. Canney

Attorney, Agent, or Firm—Burns, Doane, Swecker & Mathis

[57] ABSTRACT

The magnetic tape recording apparatus includes an erasing head for demagnetizing a magnetic tape, a recording head for recording an input recording tape on the magnetic tape, an oscillator generating an erasing A.C. signal the amplitude of which is changed in accordance with the kind of the magnetic tape, an amplitude limitter receiving the erasing A.C. signal to produce a constant A.C. signal irrespective of the kind of the magnetic tape, a gain-controlled amplifier amplifying the constant A.C. signal with a gain controlled with a gain control signal to obtain a A.C. bias signal, an adder adding the A.C. bias signal with the input recording signal to apply the added signal to the recording head, and a means for obtaining said gain control signal from the added signal. The gain control signal obtaining means may include a low-pass filter receiving the added signal, a peak-detector converting the output from the low-pass filter to a D.C. signal, and a comparator comparing the D.C. signal with a reference voltage to obtain the gain control signal.

8 Claims, 4 Drawing Figures

TAPE RECORDING APPARATUS PROVIDED WITH A BIAS CONTROL DEVICE

BACKGROUND OF THE INVENTION (1) Field of the Invention:

The present invention relates to a magnetic tape recording apparatus, and more particularly to an A.C. biasing structure for a recording magnetic head.

(2) Description of the Prior Art:

In the case of magnetically recording on a magnetic tape with a recording head, an A.C. bias signal having a predetermined magnitude is superposed on a signal current for improving distortion and dynamic range properties. The A.C. bias current is produced by using an A.C. signal generated for erasing the magnetic tape prior to recording. After the amplitude of the A.C. signal is controlled, the amplitude controlled A.C. signal is added to the input signal to be recorded for A.C. biasing.

More specifically, the magnetic tape recording apparatus uses an oscillator for generating the A.C. signal which is applied to the erasing head for erasing signals on the magnetic tape prior to recording. The A.C. signal is also subjected to the amplitude control for the A.C. biasing. The amplitude control is performed by a gain-controlled amplifier which is controlled in accordance with a signal produced by mixing the input signal to be recorded and the amplitude controlled A.C. signal with an adder. The gain-controlled amplifier is controlled to have an optimum gain for obtaining the A.C. bias signal in accordance with the frequency range of the input signal by using a low-pass filter, a peak detector and a comparator. In other words, the amplitude of the A.C. biasing signal is controlled by a feedback loop including the adder, a low-pass filter, a peak detector and a comparator.

Here, the amplitude of the erasing A.C. signal of the oscillator is changed in accordance with the kind of magnetic tape. If a metal tape is used for the magnetic tape, the amplitude of the erasing A.C. signal is made about three to four times as large as that for normal magnetic tape. Thus, the amplitude of the A.C. bias signal is changed in accordance with the kind of magnetic tape. When the amplitude of the A.C. erasing signal is changed, the gain of the gain-controlled amplifier is readjusted to obtain a new value for the optimum effective amount of A.C. bias for recording. This readjustment results from a change in the output from the comparator in the feedback loop which includes the gain controlled amplifier, the adder, the low-pass filter, the peak detector, and the comparator. Thus, the gain of the feedback loop is changed resulting in a variation of response time to the input signal or a variation of the amount of time necessary to return to a steady state when the frequency or amplitude of the input signal is changed. As a result, a tone quality is changed. Thus, the conventional bias control device has a shortcoming that the tone quality differs depending on the kind of magnetic tape to be used.

SUMMARY OF THE INVENTION

It is therefore a primary object of the present invention to provide a novel bias control device which obtains an optimum A.C. bias signal for tape recording without changing the tone quality of the recorded signal when different types of magnetic tapes are used.

According to one feature of the present invention, there is provided a bias control device for tape recording comprising an input terminal for receiving an input signal, an oscillator circuit for generating an A.C. erasing signal, an amplitude-limiting amplifier for amplifying an output of the oscillator circuit to a predetermined constant amplitude, a gain-controlled amplifier for amplifying an output of the amplitude-limiting amplifier at a gain controlled by a control signal, an adder for adding an output of the gain-controlled amplifier and the input signal, a recording magnetic head adapted to receive an output of the adder, and means for deriving the control signal for the gain-controlled amplifier from an output of the adder. The control signal deriving means may include a low-pass filter for receiving an output of the adder, an amplitude-detector for detecting the amplitude of an output from the low-pass filter, a comparator comparing the output of the amplitude-detector with a reference voltage, and means for applying the output of the comparator to the gain-controlled amplifier as the control signal.

According to the present invention, the output of the oscillator circuit is applied to the gain-controlled amplifier through the amplitude limiting amplifier, and therefore an oscillation signal having a constant amplitude is always applied to the gain-controlled amplifier even if the output level of the oscillator circuit is changed depending upon the type of magnetic tapes that are used. The loop gain of the feedback loop including the adder, the control signal deriving means and the gain-controlled amplifier is thus maintained unchanged. The constant loop gain maintains a constant response time for returning to a steady state when the frequency or amplitude of the input signal is changed, if the level of erasing A.C. signal is changed in accordance with the type of magnetic tape to be used. As a result, irrespective of the kinds of magnetic tape, the optimum bias signal for recording is obtained without changing the tone of recorded signal.

BRIEF DESCRIPTION OF THE DRAWINGS

The above-mentioned and other objects, features and advantages of the present invention will become more apparent by reference to the following detailed description taken in conjunction with the accompanying drawings, wherein.

DETAILED DESCRIPTION OF THE PREFERRED EMBODIMENT

Figure 1:
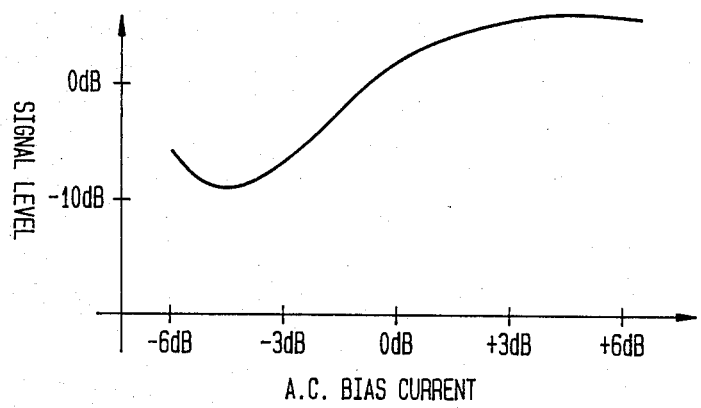
FIG. 1 is a diagram showing a relationship between an amount of A.C. bias and a maximum signal level that can be recorded on a magnetic tape for a low frequency range signal.
Figure 2:
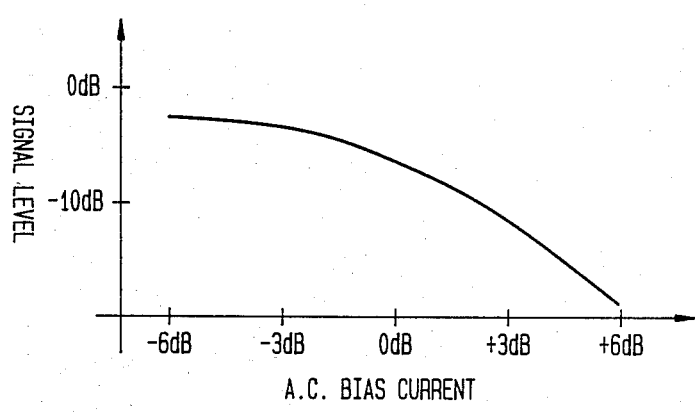
FIG. 2 is a diagram showing a relationship between an amount of A.C. bias and a maximum signal level that can be recorded on a magnetic tape for a high frequency range signal.

Prior to the explanation of bias control device, effect of A.C. bias will be explained. The effects of this A.C. bias are different in accordance with the frequency ranges of the input signal as illustrated in FIGS. 1 and 2. FIG. 1 shows a relationship between an amount of an A.C. bias and a maximum signal level that can be recorded on a magnetic tape for a low frequency range signal. A high level A.C. bias is preferable for the low frequency range signal. On the other hand, FIG. 2 shows a relationship between an amount of A.C. bias and the maximum signal level that can be recorded on a mangetic tape for a high frequency range signal. A low level A.C. bias is preferable. Thus, optimum A.C. bias levels are different depending on the frequency ranges of the signal to be recorded. Since the optimum amount of bias level is different between a low frequency range signal and a high frequency range signal, the amount of bias has been set at an intermediate value between the optimum points for the low frequency range signal and the high frequency range signal.

Moreover, it has been known that, since the signal to be recorded has a bias effect, a real amount of bias upon practical magnetic recording, that is, an effective amount of bias would be increased by the recording signal itself. In other words, if a high frequency range signal is contained with a low frequency range signal in the signal to be recorded, the high frequency range signal achieves a bias effect (mutual bias effect) upon the low frequency range signal, and hence the effective amount of bias would be increased. Consequently, there was a shortcoming that a preset bias level would become higher than the optimum value, for a low frequency range signal. In addition, there was another shortcoming that, since a high frequency range signal itself achieves a bias effect (self-bias effect), likewise the preset bias level would become higher than the optimum value.

As described above, if a constant magnitude of A.C. bias was superposed on the input signal to be recorded, the effective amount of bias sometimes deviated from a preset optimum value. Especially, a magnetic recording characteristic would be deteriorated for high frequency range signal. In order to eliminate such shortcoming, a bias control device for automatically changing an optimum A.C. bias has been proposed, as shown in FIG. 3.

A signal applied to a recording head 1 is applied to a peak detector 5 through a low-pass filter 4 that is formed of a resistor 2 and a capacitor 3. An output of the peak detector 5 is applied to an inverting input 7 of a comparator 6, which also receives a D.C. voltage fed from a reference voltage source 9 at a non-inverting input 8. An output of the comparator 6 is applied to a gain control terminal 11 of a gain-controlled amplifier 10. A part of an oscillation output of an oscillator circuit 12 is applied to an input of the gain-controlled amplifier 10. An output of the gain-controlled amplifier 10 is superposed in an adder 14 on an input signal fed through a signal input terminal 13 and then applied to the recording head 1. The output of the oscillator circuit 12 is also applied to an erasing head 15. In this connection, it is to be noted that a magnetic recording tape 16 is traveling from the side of the erasing head 15 the side of tne recording head 1 as indicated by the arrow in the figure.

Figure 3:
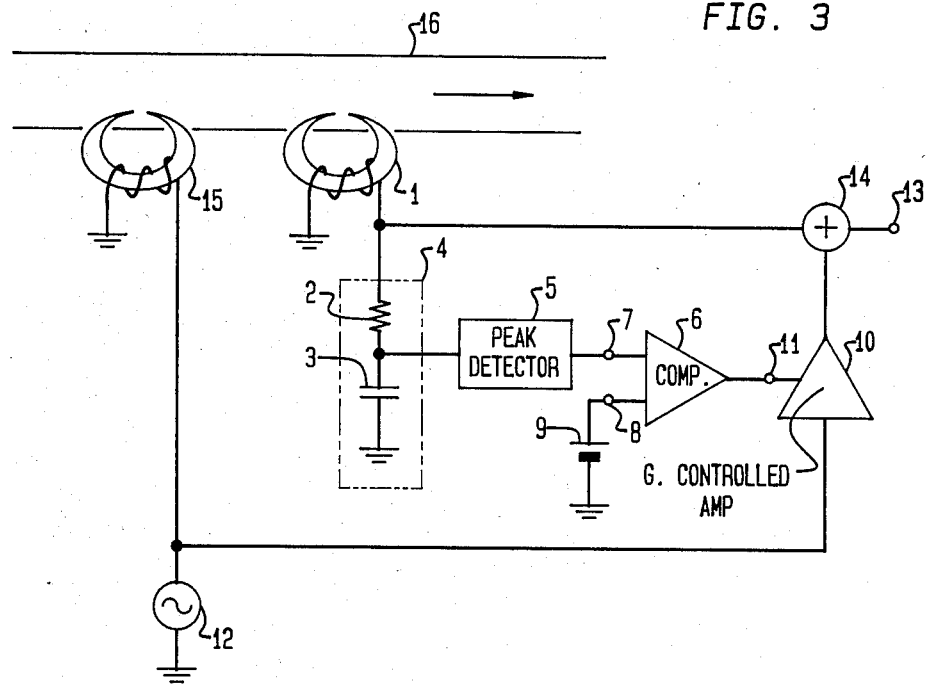
FIG. 3 is a block diagram showing a bias control device in the prior art.

The operation of the bias control device, in the prior art illustrated in FIG. 3 is as follows. During normal magnetic recording, the tape is magnetically recorded while an A.C. bias is applied with the input signal after the magnetic tape 16 has been demagnetized by the erasing head 15. The A.C. signal generated by the oscillator 12 is commonly used for forming the A.C. bias and applying an erasing current to the erasing head 15. A part of the output of the oscillator circuit 12 is amplified by the gain-controlled amplifier 10 and is superposed on a signal current as an A.C. bias current, and then the superposed current is fed to the recording head 1.

Since the recording head 1 has an inductive characteristic, the impedance of the recording head 1 is proportional to a frequency. Hence, the current flowing through the recording head 1 can be detected by passing the terminal voltage of the recording head 1 through the low-pass filter 4 to convert it into a voltage that is inversely proportional to the frequency and then detecting the converted voltage. Here, a cut-off frequency of the low-pass filter 4 is set at a frequency located nearly at the center of the signal band to be recorded. This is because the bias effects possessed by the signal itself, that is, the mutual bias effect and the self-bias effect are remarkable on the high frequency side of the signal frequency band.

In this way, the current flowing through the recording head 1 is detected by the intermediary of the low-pass filter 4, and further the effective amount of bias is detected by the peak detector 5. The effective amount of bias detected by the peak detector 5 is compared in the comparator 6 with a voltage from a reference voltage source 9. Here, the voltage of the reference voltage source 9 is set at a voltage, corresponding to an optimum amount of bias determined by the type of magnetic tape that is used.

The output of the comparator 6 is used to maintain the effective amount of bias constant irrespective of frequency range of the input signal by controlling the gain of the gain-controlled amplifier 10. More particularly, in the case where the effective amount of bias is insufficient, since the output voltage of the peak detector 5 becomes lower than the voltage of the reference voltage souce 9, the output voltage of the comparator 6 becomes high. Consequently, the gain of the gain-controlled amplifier 10 becomes large, and so, the bias control device operates to increase the level of A.C. bias signal and keep the effective amount of bias constant. On the contrary, in the case where the effective amount of bias is excessive, since the output voltage of the peak detector 5 becomes higher than the voltage of the reference voltage source 9, the output voltage of the comparator 6 becomes low. Consequently, the gain of the gain-controlled amplifier 10 becomes small, and hence the bias control device operates to decrease the level of A.C. bias signal to keep the effective amount of bias constant.

As explained above, the bias control device in the prior art illustrated in FIG. 3 resolved the problem that the effective amount of bias is changed, due to the bias effect possessed by the signal to be recorded itself, and maintains the effective amount of bias at constant and optimum value. The proposed bias control device, however, has another shortcoming. The erasing current to be passed through the erasing head 15 is properly set by switching the oscillation output level of the oscillator circuit 12 depending upon the type of magnetic tapes to be used. For instance, when a magnetic tape of the kind normally called "metal tape" is to be erased, the erasing current is set to be about three to four times as large as the erasing current in the case of erasing a normal magnetic tape. Consequently, the input signal level applied to the gain-controlled amplifier 10 differs depending upon the kind of magnetic tapes to be used. When the oscillation output level of the oscillator 12 is changed, the effective amount of A.C. bias for recording is restored to an optimum value after a transient time period. At this time, the gain is changed in accordance with the changed level of the oscillation output, causing a change in a loop gain of the feedback loop including the adder 14, the low pass filter 4, the peak detector 5, the comparator 6 and the gain-controlled amplifier 10. The change in the loop gain results in a change in time spent for obtaining the controlled A.C. recording bias in response to the input recording signal applied to the adder 14. As a result, the tone of a recorded signal is changed.

Figure 4:
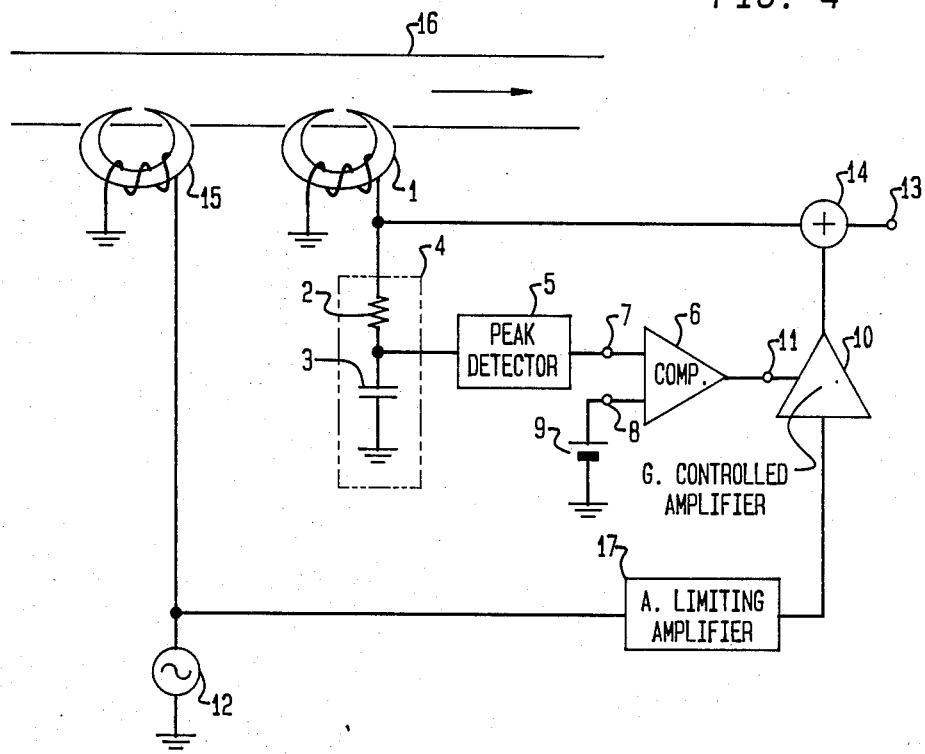
FIG. 4 is a block diagram showing a bias control device according to a preferred embodiment of the present invention.

Now a preferred embodiment of the present invention will be described with reference to FIG. 4. The bias control device according to the present invention is structurally different from the bias control device in the prior art shown in FIG. 3 in that an amplitude-limiting amplifier 17 is added between the oscillator circuit 12 and the gain-controlled amplifier 10.

The input signal to be recorded on the magnetic tape 16 which has been demagnetized by the erasing head 15 is applied via the input terminal 13 and an adder 14 to the recording head 1. The output A.C. signal from the oscillator circuit 12 is applied to the erasing head 15, and is also applied to the amplitude-limiting amplifier 17. The output with a constant amplitude from the amplitude-limiting amplifier 17 is applied to the gain-controlled amplifier 10 and is amplified with a gain controlled by a control signal applied to the gain control terminal 11. The output signal of the gain-controlled amplifier 10 is superposed on the input signal as the A.C. bias signal by the adder 14. The superposed signal is applied to the recording head 1 and to the low-pass filter 4 composed of a resistor 2 and a capacitor 3. The cut-off frequency of the low-pass filter 4 is set at the center of the audio frequency, that is 10 KHz. The output from the low-pass filter 4 is peak-detected by the peak-detector 5 and then is applied to the inverting input terminal 7 of the comparator 6 to be compared with the reference voltage applied to the non-inverting input terminal 8 of the comparator 6 from the reference voltage source 9. The compared output is applied to the gain control terminal 11 of the gain-controlled amplifier 10 as the control signal.

The amplitude-limiting amplifier 17 may be formed of any amplifier that amplifies an input signal and produces an output signal having a constant amplitude. An example of the amplitude-limiting amplifier 17 is a differential amplifier composed of first and second transistors and a constant current source connected with emitters of the two transistors. The base of the first transistor is biased at a bias voltage. The base of the second transistor is applied with an input signal, that is the output from the oscillator 12. The input signal is amplified by the second transistor to derive an output signal from a load resistor connected with the collector of the second transistor. The amplitude of the output signal is limited by a voltage obtained through the load resistor when the whole current of the constant current source is supplied thereto. The gain of the second transistor should be set so as to be saturated by the input signal. The collector of the first transistor may be connected to the power supply directly or through a resistor.

The operation for obtaining the optimum effective amount of A.C. bias is the same as in the bias control device shown in FIG. 3. If the signal level of the output A.C. signal from the oscillator 12 is changed to accommodate the kind of magnetic tape 16, that is used the A.C. signal which is applied to the gain-controlled amplifier 10 from the amplitude-limiting amplifier 17 is unchanged and kept constant. Therefore, the operating conditions of the gain-controlled amplifier 10, the adder 14, the low-pass filter 4, the peak detector 5 and the comparator 6 are maintained unchanged. This means that the operation for producing the optimum effective A.C. bias signal is not disturbed by the change in level of the A.C. signal of the oscillator 12. Thus, there is no change in the period of time necessary for obtaining the controlled A.C. bias signal in response to the input recording signal applied to the adder 14. Therefore, even if the output signal level of the oscillator 12 is changed to accommodate a change in the kind of magnetic tape to be recorded, on the tone quality of recorded signal is not changed.

Although the present invention has been described with reference to a preferred embodiment, any modification may be applied to the embodiment without departing from the spirit of the present invention. For example, the peak detector may be replaced with other suitable detectors for converting an A.C. voltage to a D.C. voltage. Any kinds of peak detectors, comparators and gain-controlled amplifiers may be used as the peak detector 5, the comparator 6 and the gain-controlled amplifier 10, respectively. Similarly, the amplitude-limiting amplifier 17 is not limited to the above explained differential type. Any other circuit producing a constant amplitude output in response to an input signal may be used therefor.

What is claimed is:

1. A tape recording apparatus comprising:
an input terminal receiving an input recording signal;
an erasing head for demagnetizing a magnetic tape;
a recording head for recording said input recording signal on said magnetic tape;
an oscillator generating an A.C. signal which is applied to said erasing head for demagnetizing said magnetic tape;
an amplitude-limiting amplifier receiving said A.C. signal and deriving a constant amplitude A.C. signal;
a gain-controlled amplifier amplifying said constant amplitude A.C. signal with a gain controlled by a gain control signal to obtain an A.C. bias signal;
an adder adding said input recording signal with said A.C. bias signal;
a means for applying the added signal obtained from said adder to said recording head; and
a means for obtaining said gain control signal from said added signal.

2. A tape recording apparatus as claimed in claim 1, wherein the amplitude of said A.C. signal is changed in accordance with the kind of said magnetic tape, said constant amplitude A.C. signal being constant irrespective of the change of said A.C. signal.

3. A tape recording apparatus as claimed in claim 2, wherein said gain control signal obtaining means includes a low-pass filter receiving said added signal, a convertor converting the output from said low-pass filter to a D.C. signal, a reference voltage source producing a reference voltage, a comparator comparating said D.C. signal with said reference voltage, and a means for applying the outout of said comparator to said gain-controlled amplifier as said gain control signal.

4. A tape recording apparatus as claimed in claim 3, wherein said converter is a peak detector.

5. A tape recording apparatus comprising:
an input terminal receiving an input recording signal;
a recording head recording said input recording signal on a magnetic tape;

an oscillator generating an A.C. signal the amplitude of which is changed according to the kind of said magnetic tape;

an amplitude limitter receiving said A.C. signal and producing a constant A.C. signal having a constant amplitude irrespective of the kind of said magnetic tape;

a gain-controlled amplifier amplifying said constant A.C. signal with a gain controlled with a gain control signal to obtain a controlled A.C. signal;

an adder adding said input recording signal with said controlled A.C. signal, the added signal being applied to said recording head to record said input recording signal on said magnetic tape; and a means for producing said gain control signal from said added signal.

6. A tape recording apparatus as claimed in claim 5, wherein said gain control signal producing means includes a low-pass filter receiving said added signal, a means for converting the output from said low-pass filter to a D.C. signal, a reference voltage source producing a reference voltage, a comparator comparing said D.C. signal with said reference voltage to obtain said gain control signal.

7. A tape recording apparatus as claimed in claim 6, wherein said converting means is a peak detector.

8. A tape recording apparatus as claimed in claim 7, wherein said A.C. signal is an erasing signal, said tape recording apparatus further comprising an erasing head receiving said erasing signal for demagnetizing said magnetic tape prior to recording said input recording signal.

* * * * *